(12) United States Patent
Jiang

(10) Patent No.: US 10,764,268 B2
(45) Date of Patent: *Sep. 1, 2020

(54) SECURITY CONTROLLER (SC) RESTORATION METHOD AND APPARATUS

(71) Applicant: Huawei Technologies Co., Ltd., Shenzhen (CN)

(72) Inventor: Tong Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

This patent is subject to a terminal disclaimer.

(21) Appl. No.: 16/057,552

(22) Filed: Aug. 7, 2018

(65) Prior Publication Data

US 2018/0351934 A1 Dec. 6, 2018

Related U.S. Application Data

(63) Continuation of application No. 14/951,114, filed on Nov. 24, 2015, now Pat. No. 10,116,639, which is a
(Continued)

(30) Foreign Application Priority Data

May 31, 2013 (CN) .......................... 2013 1 0213394

(51) Int. Cl.
*H04L 29/06* (2006.01)
*H04W 12/06* (2009.01)

(52) U.S. Cl.
CPC .............. *H04L 63/08* (2013.01); *H04L 63/06* (2013.01); *H04W 12/06* (2013.01)

(58) Field of Classification Search
CPC ......... H04L 9/30; H04L 12/403; H04L 63/06; H04L 63/08; H04L 1/22; H04L 12/423;
(Continued)

(56) References Cited

U.S. PATENT DOCUMENTS 5,621,662 A * 4/1997 Humphries ............ G05B 15/02
340/3.1
7,065,039 B2 * 6/2006 Ying ..................... H04L 12/422
370/222
(Continued)

FOREIGN PATENT DOCUMENTS

CN 1859378 A 11/2006
CN 101335655 B 2/2011
(Continued)

OTHER PUBLICATIONS

ITU-T G.9961 Telecommunication Standardization Sector of ITU Amendment 1, "Series G: Transmission Systems and Media, Digital Systems and Networks Access networks—In premises networks Unified high-speed wire-line based home networking transceivers—Data link layer specification Amendment 1," Recommendation ITU-T G.9961, pp. i-73, 80 pages, International Telecommunication Union, Geneva, Switzerland, (Sep. 2012).

*Primary Examiner* — Thanhnga B Truong
(74) *Attorney, Agent, or Firm* — Leydig, Voit & Mayer, Ltd.

(57) ABSTRACT

A security controller (SC) restoration method is provided. The method includes: designating, by a master node, a node to which a backup SC belongs, where the master node includes an original DM or a backup DM; sending, by the master node to a first node, a message indicating the backup SC, where the message indicating the backup SC includes an identifier of the node to which the backup SC belongs; in a case in which a node to which an original SC belongs is disconnected, sending, by the master node to the first node, a message for enabling an SC function, for performing authentication, according to the message for enabling an SC function.

20 Claims, 11 Drawing Sheets

---

A master node designates a node to which a backup SC belongs, where the master node includes an original domain master node DM or a backup DM — 101

The master node sends, to a first node, a message indicating the backup SC, where the message indicating the backup SC includes an identifier of the node to which the backup SC belongs — 102

In a case in which a node to which an original SC belongs is disconnected, the master node sends, to the first node, a message for enabling an SC function, so that the first node performs authentication, according to the message for enabling an SC function, on the node to which the backup SC belongs, where the message for enabling an SC function includes the identifier of the node to which the backup SC belongs — 103

Related U.S. Application Data continuation of application No. PCT/CN2014/078825, filed on May 29, 2014.

(58) Field of Classification Search
CPC .......... G06F 15/173; G06F 7/04; G06F 12/16; G06F 17/30; H04W 12/06; G11C 5/00
See application file for complete search history.

(56) References Cited

U.S. PATENT DOCUMENTS

| | | | |
|---|---|---|---|
| 7,165,154 B2* | 1/2007 | Coombs | G06F 11/1448 711/162 |
| 2003/0076789 A1 | 4/2003 | Kimura et al. | |
| 2005/0195660 A1* | 9/2005 | Kavuri | G06F 3/0605 365/189.05 |
| 2009/0296924 A1* | 12/2009 | Oksman | H04L 9/083 380/30 |
| 2009/0300760 A1 | 12/2009 | Chitor et al. | |
| 2012/0226901 A1 | 9/2012 | Pandey et al. | |
| 2012/0324554 A1 | 12/2012 | Gomez Martinez et al. | |

FOREIGN PATENT DOCUMENTS

| | | |
|---|---|---|
| EP | 1261231 A1 | 11/2002 |
| EP | 1956463 A2 | 8/2008 |

\* cited by examiner

SECURITY CONTROLLER (SC) RESTORATION METHOD AND APPARATUS

CROSS-REFERENCE TO RELATED APPLICATIONS

This application is a continuation of U.S. patent application Ser. No. 14/951,114, filed on Nov. 24, 2015, which is a continuation of International Application No. PCT/CN2014/078825, filed on May 29, 2014. The International Application claims priority to Chinese Patent Application No. 201310213394.4, filed on May 31, 2013. All of the aforementioned patent applications are hereby incorporated by reference in their entireties.

TECHNICAL FIELD

Embodiments of the present invention relate to the communications field, and in particular, to a security controller (SC) restoration method and an apparatus.

BACKGROUND

A home network refers to a home informatization platform that integrates a home control network with a multimedia information network. The home network may be a wireless communications network or a wired communications network, and a transmission medium of the home network may be an electrical power cable, a coaxial cable, a telephone line, or the like. The home network includes at least one domain. A domain is generally a centralized management network. Each domain has a domain master node (DM) and several slave nodes. In addition to being a common node, the DM further needs to be responsible for management of the entire domain, including domain creation, node registration, bandwidth allocation and resource scheduling of the domain, coordination with a neighboring domain or network, power consumption management in the domain, and the like. For a domain that works in a security mode, the domain further includes a security controller (SC), and the SC is responsible for managing authentication and a key. A registered node can perform generation of a key and transmission of data only after authentication is completed on the SC.

The DM sends a media access plan (MAP) frame in each media access control (MAC) period, and a MAP indicates distribution of a transmission opportunity for a node to perform resource scheduling, and a related parameter required by work in another domain. A node finds existence of a domain by detecting the MAP frame, and sends, to the DM according to information in the MAP frame, a registration request to be added to the domain. In addition, after registration is successful, authentication is performed on the SC, and transmission of data can be performed only after the authentication succeeds.

In the home network, the following may occur: A device used as an SC is disconnected, or an SC is disconnected because, for example, a user disables the device used as the SC. Consequently, there is no available SC in a domain or a network, so that the domain or the network cannot normally work in a security mode. For example, a node that newly accesses a network, or a node that requires re-authentication cannot fails to be authenticated, and a node that needs to update a key fails to update the key.

SUMMARY

Embodiments of the present invention provide a security controller (SC) restoration method and an apparatus, which are used to improve network stability.

To achieve the foregoing objectives, the following technical solutions are used in the embodiments of the present invention:

According to a first aspect, a security controller (SC) restoration method is provided, including:

designating, by a master node, a node to which a backup SC belongs, where the master node includes an original DM or a backup DM;

sending, by the master node to a first node, a message indicating the backup SC, where the message indicating the backup SC includes an identifier of the node to which the backup SC belongs; and in a case in which a node to which an original SC belongs is disconnected, sending, by the master node to the first node, a message for enabling an SC function, so that the first node performs authentication, according to the message for enabling an SC function, on the node to which the backup SC belongs, where the message for enabling an SC function includes the identifier of the node to which the backup SC belongs.

With reference to the first aspect, in a first possible implementation manner, when the master node is the same as the node to which the backup SC belongs, the first node is a node except the master node; and the method further includes: activating, by the master node, an SC function of the master node, and performing authentication within the master node; or when the master node is different from the node to which the backup SC belongs, the first node is a node except the master node and the node to which the backup SC belongs; and the method further includes: sending, by the master node to the node to which the backup SC belongs, the message for enabling an SC function and/or a re-authentication request message, so that the node to which the backup SC belongs activates an SC function of the node to which the backup SC belongs, and performs authentication within the node to which the backup SC belongs.

With reference to the first aspect, in a second possible implementation manner, the designating, by a master node, a node to which a backup SC belongs includes:

pre-designating, by the master node according to a network topology, the node to which the backup SC belongs from a node that has an SC capability, where the master node is the original DM.

With reference to the second possible implementation manner of the first aspect, in a third possible implementation manner, the method further includes: determining, by the master node, that the node to which the original SC belongs is disconnected, where the determining, by the master node, that the node to which the original SC belongs is disconnected includes:

receiving, by the master node, a re-authentication instruction message sent by the node to which the backup SC belongs; and determining, by the master node according to the re-authentication instruction message, that the node to which the original SC belongs is disconnected; or monitoring, by the master node, a status of the node to which the original SC belongs.

With reference to the first aspect, in a fourth possible implementation manner, the designating, by a master node, a node to which a backup SC belongs includes:

in a case in which it is determined that the node to which the original SC belongs is disconnected, designating, by the master node according to a network topology, the node to which the backup SC belongs from a node that has an SC capability, where when the node to which the original SC belongs is the same as the original DM, the master node is the backup DM; or, when the node to which the original SC belongs is different from the original DM, the master node is the original DM.

With reference to the fourth possible implementation manner of the first aspect, in a fifth possible implementation manner, the method further includes: determining, by the master node, that the node to which the original SC belongs is disconnected, where the determining, by the master node, that the node to which the original SC belongs is disconnected includes:

when the node to which the original SC belongs is the same as the original DM, monitoring, by the master node, the original DM; and when the original DM is disconnected, determining, by the master node, that the node to which the original SC belongs is disconnected; or when the node to which the original SC belongs is different from the original DM, monitoring, by the master node, a status of the node to which the original SC belongs.

According to a second aspect, a security controller SC restoration method is provided, including:

determining, by a node to which a backup SC belongs, that a node to which an original SC belongs is disconnected;

activating, by the node to which the backup SC belongs, an SC function of the node to which the backup SC belongs, and performing internal authentication;

receiving, by the node to which the backup SC belongs, a re-authentication request message sent by a second node, where the second node is a node except the node to which the backup SC belongs; and performing, by the node to which the backup SC belongs, authentication on the second node according to the re-authentication request message.

With reference to the second aspect, in a first possible implementation manner, the determining, by a node to which a backup SC belongs, that a node to which an original SC belongs is disconnected includes:

monitoring, by the node to which the backup SC belongs, the node to which the original SC belongs; or receiving, by the node to which the backup SC belongs, a message for instructing to enable an SC function that is sent by a master node; and determining, according to the message for enabling an SC function, that the node to which the original SC belongs is disconnected, where the message for enabling an SC function includes an identifier of the node to which the backup SC belongs.

According to a third aspect, a security controller SC restoration method is provided, including:

receiving, by a common node, a message for instructing to enable an SC function that is sent by a master node, where the message for instructing to enable an SC function includes an identifier of a node to which a backup SC belongs, the master node includes an original DM or a backup DM, and the common node does not includes the node to which the backup SC belongs; and sending, by the common node according to the identifier of the node to which the backup SC belongs, a re-authentication request message to the node to which the backup SC belongs, so that the node to which the backup SC belongs performs authentication on the common node according to the re-authentication request message.

According to a fourth aspect, a node is provided, including:

a designating unit, configured to designate a node to which a backup SC belongs, where the node includes an original DM or a backup DM; and a sending unit, configured to send, to a first node, a message indicating the backup SC, where the message indicating the backup SC includes an identifier, transmitted by the designating unit, of the node to which the backup SC belongs; where the sending unit is further configured to: in a case in which a node to which an original SC belongs is disconnected, send, to the first node, a message for enabling an SC function, so that the first node performs authentication, according to the message for enabling an SC function, on the node to which the backup SC belongs, where the message for enabling an SC function includes the identifier of the node to which the backup SC belongs.

With reference to the fourth aspect, in a first possible implementation manner, when the node is the same as the node to which the backup SC belongs, the first node is a node except the node; and the node further includes:

an activating unit, configured to activate an SC function of the node; and an authentication unit, configured to perform authentication within the node; or when the node is different from the node to which the backup SC belongs, the first node is a node except the node and the node to which the backup SC belongs; and the sending unit is further configured to send, to the node to which the backup SC belongs, the message for enabling an SC function and/or a re-authentication request message, so that the node to which the backup SC belongs activates an SC function of the node to which the backup SC belongs, and performs authentication within the node to which the backup SC belongs.

With reference to the first possible implementation manner of the fourth aspect, in a second possible implementation manner, the designating unit is configured to pre-designate, according to a network topology, the node to which the backup SC belongs from a node that has an SC capability, where the node is the original DM.

With reference to the second possible implementation manner of the fourth aspect, in a third possible implementation manner, the node further includes:

a determining unit, configured to determine that the node to which the original SC belongs is disconnected; and the node further includes: a receiving unit, configured to receive a re-authentication instruction message sent by the node to which the backup SC belongs; where the determining unit is configured to determine, according to the re-authentication instruction message, that the node to which the original SC belongs is disconnected; or the determining unit is configured to monitor a status of the node to which the original SC belongs.

With reference to the fourth aspect, in a fourth possible implementation manner, the designating unit is configured to: in a case in which the node determines that the node to which the original SC belongs is disconnected, designate, according to a network topology, the node to which the backup SC belongs from a node that has an SC capability, where
  when the node to which the original SC belongs is the same as the original DM, the node is the backup DM; or, when the node to which the original SC belongs is different from the original DM, the node is the original DM.

With reference to the fourth possible implementation manner of the fourth aspect, in a fifth possible implementation manner, the node further includes:
  a determining unit, configured to determine that the node to which the original SC belongs is disconnected, and configured to:
  when the node to which the original SC belongs is the same as the original DM, monitor the original DM; and when the original DM is disconnected, determine that the node to which the original SC belongs is disconnected; or
  when the node to which the original SC belongs is different from the original DM, monitor a status of the node to which the original SC belongs.

According to a fifth aspect, a node is provided, where the node includes:
  a determining unit, configured to determine that a node to which an original SC belongs is disconnected;
  an activating unit, configured to activate an SC function of the node in a case in which the determining unit determines that the node to which the original SC belongs is disconnected;
  an authentication unit, configured to perform internal authentication after the activating unit activates the SC function; and
  a receiving unit, configured to receive a re-authentication request message sent by a second node, where the second node is a node except the node; where
  the authentication unit is further configured to perform authentication on the second node according to the re-authentication request message.

With reference to the fifth aspect, in a first possible implementation manner, the determining unit is configured to:
  monitor the node to which the original SC belongs; or
  receive a message for instructing to enable an SC function that is sent by a master node; and determine, according to the message for enabling an SC function, that the node to which the original SC belongs is disconnected, where the message for enabling an SC function includes an identifier of the node.

According to a sixth aspect, a node is provided, including:
  a receiving unit, configured to receive a message for instructing to enable an SC function that is sent by a master node, where the message for instructing to enable an SC function includes an identifier of a node to which a backup SC belongs, and the master node includes an original DM or a backup DM; and
  a sending unit, configured to send, according to the identifier of the node to which the backup SC belongs, a re-authentication request message to the node to which the backup SC belongs, so that the node to which the backup SC belongs performs authentication on the node according to the re-authentication request message.

According to the security controller SC restoration method provided in the embodiments of the present invention, a master node designates a node to which a backup SC belongs; in a case in which a node to which an original SC belongs is disconnected, a message for enabling an SC function is sent to a first node, so that the first node performs authentication, according to the message for enabling an SC function, on the node to which the backup SC belongs. Alternatively, in a case in which it is determined that a node to which an original SC belongs is disconnected, a node to which a backup SC belongs activates an SC function of the node to which the backup SC belongs, and performs internal authentication; when a re-authentication request message sent by a second node is received, authentication is performed on the second node. Alternatively, when a message for instructing to enable an SC function sent by a master node is received, a common node sends a re-authentication request message to a node to which a backup SC belongs, so that the node to which the backup SC belongs performs authentication on the common node. SC restoration is implemented in a case in which a node to which an original SC belongs is disconnected, so that a network normally works in a security mode, improving network stability.

DESCRIPTION OF EMBODIMENTS

The following exemplarily describes a security controller SC restoration method and an apparatus in embodiments of the present invention with reference to the accompany drawings.

To clearly describe the method and apparatus provided in the embodiments of the present invention, the following describes specific characteristics of some concepts in the embodiments of the present invention:

Common node: has a DM function and/or an SC function but does not enable these functions in a normal working state; or does not have a DM function or an SC function.

Original DM: has a DM function and is a master node in a normal working state.

Backup DM: has a DM function and is a common node in a normal working state; and after the original DM is disconnected due to a reason, enables the DM function to become a master node.

Node to which an original SC belongs: has an SC function, enables the SC function in a normal working state, and performs a work task of an SC.

Node to which a backup SC belongs: has an SC function and is a common node in a normal working state; and after the node to which the original SC belongs is disconnected due to a reason, enables the SC function, and performs a work task of an SC.

A node that has a DM function and an SC function may simultaneously enable the DM function and SC function, that is, the original DM and the node to which the original SC belongs may be a same node, and the backup DM and the node to which the backup SC belongs may be a same node.

Figure 1:
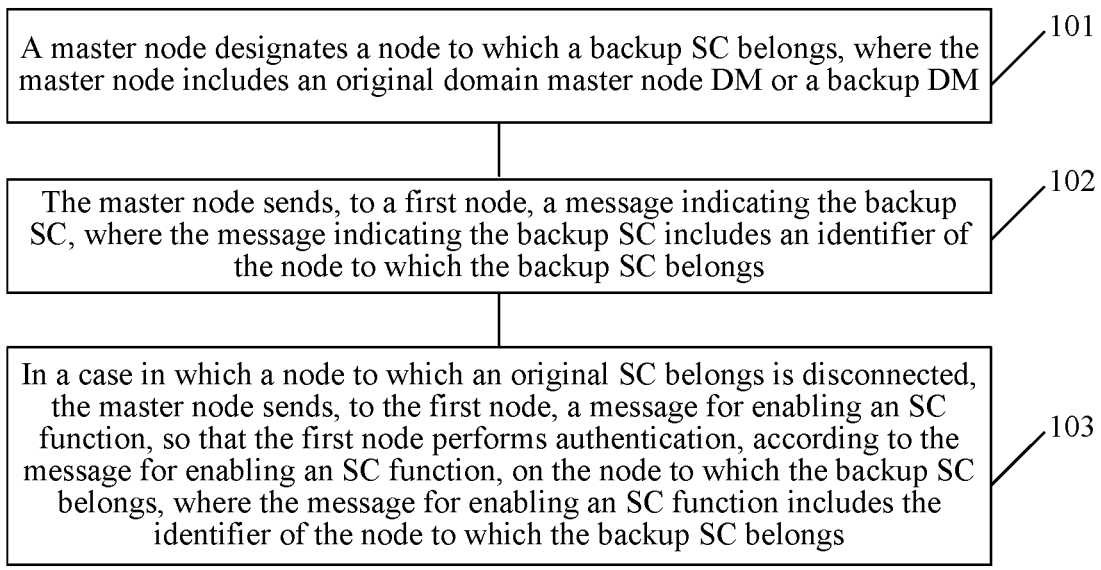
FIG. 1 is a schematic flowchart of an SC restoration method according to an embodiment of the present invention.

Referring to FIG. 1, FIG. 1 shows a security controller SC restoration method provided in an embodiment of the present invention, where the method includes:

101. A master node designates a node to which a backup SC belongs, where the master node includes an original DM or a backup DM.

Exemplarily, the security controller SC restoration method provided in this embodiment of the present invention may be applied to a scenario in which a fault occurs in a device that has a similar SC function in a wired home network communications system such as an electrical power cable communications network, or in another communications network.

A method for acquiring the backup DM may include but not be limited to the following two methods:

(1) The original DM pre-designates a node that has a DM function as the backup DM.

(2) In a case in which the original DM has not designated the backup DM and the original DM is disconnected, nodes that have a DM function may compete with each other, and finally a node becomes the backup DM.

It should be noted that, the backup DM is a common node before the DM function is enabled, and becomes a master node after the DM function is enabled; the node to which the backup SC belongs is a common node before an SC function is enabled, and performs a work task of an SC after the SC function is enabled. That is, the backup DM and the node to which the backup SC belongs undertake different roles in different states.

It should be understood by a person skilled in the art that, the backup DM or the node to which the backup SC belongs proposed in different cases has different meanings, for example, it is described in step 101 that the master node described includes the backup DM. It may be learned that, the backup DM herein refers to a backup DM that has enabled the DM function; the backup DM in the method for acquiring a backup DM may be a backup DM that has not enabled the DM function. For similar cases in the following embodiments, details are not described again.

Further, step 101 may include but not be limited to the following two implementation manners:

Manner 1: The master node pre-designates, according to a network topology, the node to which the backup SC belongs from a node that has an SC capability, where the master node is the original DM.

Manner 2: In a case in which it is determined that a node to which an original SC belongs is disconnected, the master node designates, according to a network topology, the node to which the backup SC belongs from a node that has an SC capability, where: when the node to which the original SC belongs is the same as the original DM, the master node is the backup DM; or when the node to which the original SC belongs is different from the original DM, the master node is the original DM.

The foregoing manner 1 and manner 2 may be that:

(1) the original DM designates the node to which the backup SC belongs, which includes that:

the original DM pre-designates, according to the network topology, the node to which the backup SC belongs from the node that has an SC capability; or, in a case in which the node to which the original SC belongs is different from the original DM, the node to which the original SC belongs is disconnected, and the original DM has not designated the node to which the backup SC belongs, the original DM designates, according to the network topology, the node to which the backup SC belongs from the node that has an SC capability; and (2) the backup DM designates the node to which the backup SC belongs, which includes that:

in a case in which the node to which the original SC belongs is the same as the original DM, the node to which the original SC belongs is disconnected (that is, the original DM is disconnected), and the original DM has not designated the node to which the backup SC belongs, the backup DM designates, according to the network topology, the node to which the backup SC belongs from the node that has an SC capability, where the backup DM may be acquired by using the foregoing methods (1) and (2), and the like, and the backup DM acquired by using the foregoing method (1) designates, after the DM function is enabled (that is, after the backup DM becomes the master node), the node to which the backup SC belongs.

Further, the method further includes: determining, by the master node, that the node to which the original SC belongs is disconnected.

Exemplarily, this embodiment of the present invention imposes no limitation on a manner of determining, by the master node, that the node to which the original SC belongs is disconnected. The following lists several optional manners:

Optionally, in the foregoing first case, the determining, by the master node, that the node to which the original SC belongs is disconnected may include: receiving, by the master node, a re-authentication instruction message sent by the node to which the backup SC belongs; and determining, by the master node according to the re-authentication instruction message, that the node to which the original SC belongs is disconnected, where the master node is the original DM.

Exemplarily, in a case in which the original DM pre-designates the node to which the backup SC belongs, when the original DM is different from the node to which the backup SC belongs, in a case in which it is monitored that the node to which the original SC belongs is disconnected, the node to which the backup SC belongs activates an SC function of the node to which the backup SC belongs, and sends the re-authentication instruction message to the original DM, so as to indicate that the node to which the original SC belongs is already disconnected, and the node to which the backup SC belongs needs to reperform an authentication process.

Optionally, in the foregoing first case, the determining, by the master node, that the node to which the original SC belongs is disconnected may further include: monitoring, by the master node, whether the node to which the original SC belongs is disconnected, where the master node is the original DM.

The foregoing may include: in a case in which the master node has not received, within a preset time, a re-registration request message sent by the node to which the original SC belongs, determining that the node to which the original SC belongs is disconnected.

Optionally, in the foregoing second case, the determining, by the master node, that the node to which the original SC belongs is disconnected may include: when the node to which the original SC belongs is the same as the original DM, monitoring, by the master node, the original DM; and when the original DM is disconnected, determining, by the master node, that the node to which the original SC belongs is disconnected, where the master node is the backup DM.

Exemplarily, when the node to which the original SC belongs is the same as the original DM and the original DM is disconnected, the node to which the original SC belongs is disconnected. Therefore, whether the node to which the original SC belongs is disconnected may be determined by monitoring, by the backup DM, whether the original DM is disconnected. The backup DM herein may be the backup DM acquired in a manner such as the foregoing (1) and (2).

Optionally, in the foregoing second case, the determining, by the master node, that the node to which the original SC belongs is disconnected may further include: when the node to which the original SC belongs is different from the original DM, monitoring, by the original DM, whether the node to which the original SC belongs is disconnected, where the master node is the original DM.

The foregoing may include: in a case in which the master node has not received, within a preset time, a re-registration request message sent by the node to which the original SC belongs, determining that the node to which the original SC belongs is disconnected.

102. The master node sends, to a first node, a message indicating the backup SC, where the message indicating the backup SC includes an identifier of the node to which the backup SC belongs.

Case 1: When the master node is the same as the node to which the backup SC belongs, the first node is a node except the master node.

Exemplarily, the case may include the following: The original DM pre-designates (before a node to which an SC belongs is disconnected) the original DM as the node to which the backup SC belongs, and sends the message indicating the backup SC to another node in the domain, so as to notify the another node of the identifier of the node to which the backup SC belongs; or when the original DM has not designated the node to which the backup SC belongs, after the original DM is disconnected due to a reason, the backup DM designates the backup DM as the node to which the backup SC belongs, and sends the message indicating the backup SC to another node in the domain, so as to notify the another node of the identifier of the node to which the backup SC belongs.

In this case, the method further includes: activating, by the master node, an SC function of the master node, and performing authentication within the master node.

After activating the SC function of the master node, the master node is responsible for performing authentication on a node in the domain, where the node herein may include the master node, and a node except the master node. In addition, after performing authentication on a node in the domain, the master node may further be responsible for updating or creating a key for the node.

Case 2: When the master node is different from the node to which the backup SC belongs, the first node is a node except the master node and the node to which the backup SC belongs; and the method further includes: sending, by the master node to the node to which the backup SC belongs, the message for enabling an SC function and/or a re-authentication request message, so that the node to which the backup SC belongs activates an SC function of the node to which the backup SC belongs, and performs authentication within the node to which the backup SC belongs.

Exemplarily, the node to which the backup SC belongs may simultaneously or successively receive the message for enabling an SC function and the re-authentication request message that are sent by the master node; when receiving either message, the node to which the backup SC belongs may determine that the node to which the original SC belongs is disconnected, activate the SC function of the node to which the backup SC belongs, and perform authentication within the node to which the backup SC belongs. In addition, when receiving the re-authentication request message sent by the master node, the node to which the backup SC belongs further performs authentication on the master node.

After designating the node to which the backup SC belongs, the master node may send, by broadcasting a MAP frame, the message indicating the backup SC to the first node, where the frame carries the identifier of the node to which the backup SC belongs. In addition, the frame may further carry a message indicating whether to enable an SC function, for example, carry a flag for enabling an SC function. Certainly, the message indicating the backup SC may be sent to the first node in another manner, which is not limited in this embodiment of the present invention.

103. In a case in which a node to which an original SC belongs is disconnected, the master node sends, to the first node, a message for enabling an SC function, so that the first node performs authentication, according to the message for enabling an SC function, on the node to which the backup SC belongs, where the message for enabling an SC function includes the identifier of the node to which the backup SC belongs.

Exemplarily, after pre-designating the node to which the backup SC belongs, the original DM may broadcast, to another SC node, a MAP frame that carries the identifier of the node to which the backup SC belongs and information for not enabling an SC function; in a case in which it is determined that the node to which the original SC belongs is disconnected, the original DM broadcasts, to the another SC node, a MAP frame that carries the identifier of the node to which the backup SC belongs and information for enabling an SC function, so that the another node learns that the node to which the original SC belongs is disconnected, and sends the re-authentication request message to the node to which the backup SC belongs, so as to reperform an authentication process by the node to which the backup SC belongs, where the information for enabling an SC function may be a MAP frame that includes the flag for enabling an SC function.

Alternatively, in a case in which the original DM has not designated the node to which the backup SC belongs, and the node to which the original SC belongs is disconnected, after the original DM or the backup DM designates the node to which the backup SC belongs, the original DM or the backup DM may broadcast, to another SC node, a MAP frame that carries the identifier of the node to which the backup SC belongs and information for enabling an SC function, so that the another node learns that the node to which the original SC belongs is disconnected, and sends the re-authentication request message to the node to which the backup SC belongs, so as to reperform an authentication process by the node to which the backup SC belongs.

According to the security controller SC restoration method provided in this embodiment of the present invention, a master node designates a node to which a backup SC belongs, sends a message indicating the backup SC to a first node, and sends, in a case in which a node to which an original SC belongs is disconnected, a message for enabling the backup SC to the first node, so that the first node performs authentication, according to the message for enabling an SC function, on the node to which the backup SC belongs. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

Figure 2:
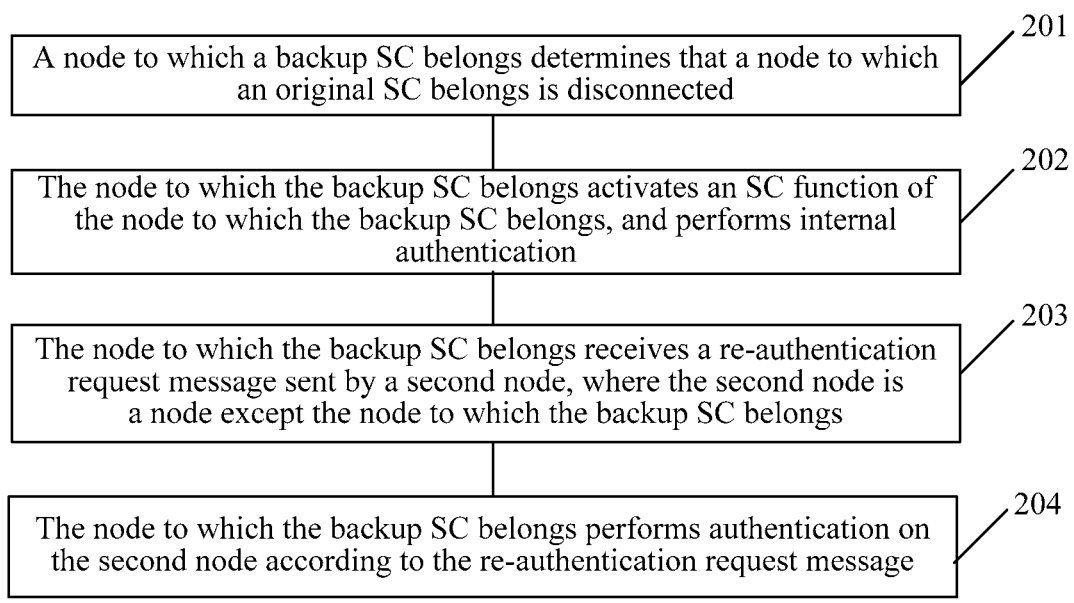
FIG. 2 is a schematic flowchart of another SC restoration method according to an embodiment of the present invention.

According to one aspect, referring to FIG. 2, FIG. 2 is a security controller SC restoration method provided in an embodiment of the present invention, where the method includes:

201. A node to which a backup SC belongs determines that a node to which an original SC belongs is disconnected.

Step 201 includes but is not limited to the following implementation manners:

(1) The node to which the backup SC belongs monitors the node to which the original SC belongs.

Exemplarily, this embodiment imposes no limitation on a method for monitoring, by the node to which the backup SC belongs, the node to which the original SC belongs. For example, the node to which the backup SC belongs may periodically send an SC status detection message to the node to which the original SC belongs; if the node to which the backup SC belongs has consecutively sent the SC status detection message for a preset quantity of times and has not received a status response message from the node to which the original SC belongs within a preset time, it is determined that the node to which the original SC belongs is disconnected. Alternatively, after sending a re-authentication request message or key updating message to the node to which the original SC belongs, when the node to which the backup SC belongs has not received a response message from the node to which the original SC belongs within a preset time, the node to which the backup SC belongs sends a status detection message to the node to which the original SC belongs; when the node to which the backup SC belongs has not received a status response message from the node to which the original SC belongs, the node to which the backup SC belongs determines that the node to which the original SC belongs is disconnected.

(2) The node to which the backup SC belongs receives a message for instructing to enable an SC function that is sent by an original DM or a backup DM, and determines, according to the message for enabling an SC function, that the node to which the original SC belongs is disconnected, where the message for enabling an SC function includes an identifier of the node to which the backup SC belongs.

Exemplarily, when the original DM is different from the node to which the original SC belongs, in a case in which it is monitored that the node to which the original SC belongs is disconnected, the original DM sends the message for instructing to enable an SC function to the node to which the backup SC belongs and designated by the original DM, so that the node to which the backup SC belongs activates an SC function. For a method for monitoring, by the original DM, whether the node to which the original SC belongs is disconnected, reference may be made to the foregoing embodiment, and details are not described herein again. In a specific implementation process, the message for instructing to enable an SC function may be a flag for enabling an SC in a MAP frame.

Alternatively, when the original DM is the same as the node to which the original SC belongs and the node to which the original SC belongs is disconnected, the original DM is disconnected. Whether the node to which the original SC belongs is disconnected may be determined by monitoring, by the backup DM, whether the original DM is disconnected; in a case in which the node to which the original SC belongs is disconnected, the message for instructing to enable an SC function is sent to the node to which the backup SC belongs, so that the node to which the backup SC belongs enables an SC function, where the node to which the backup SC belongs may be designated by the original DM, or may be designated by the backup DM. For specific methods for designating the backup SC and acquiring the backup DM, reference may be made to the foregoing embodiment, and details are not described herein again.

202. The node to which the backup SC belongs activates an SC function of the node to which the backup SC belongs, and performs internal authentication.

Exemplarily, step 202 is a process of restoring an SC by the node to which the backup SC belongs.

203. The node to which the backup SC belongs receives a re-authentication request message sent by a second node, where the second node is a node except the node to which the backup SC belongs.

Exemplarily, after activating the SC function of the node to which the backup SC belongs, the node to which the backup SC belongs is responsible for authentication on, key updating for, and creation of a node in a domain.

204. The node to which the backup SC belongs performs authentication on the second node according to the re-authentication request message.

Optionally, when the node to which the backup SC belongs is different from a master node, the second node includes the master node and a common node, and the common node does not include the node to which the backup SC belongs.

Optionally, when the node to which the backup SC belongs is the same as a master node, the second node includes a common node, and the common node does not include the node to which the backup SC belongs.

According to the security controller SC restoration method provided in this embodiment of the present invention, in a case in which it is determined that a node to which an original SC belongs is disconnected, a node to which a backup SC belongs activates an SC function of the node to which the backup SC belongs, and performs internal authentication, then receives a re-authentication request message sent by a second node, and performs authentication on the second node according to the re-authentication request message. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

Figure 3:
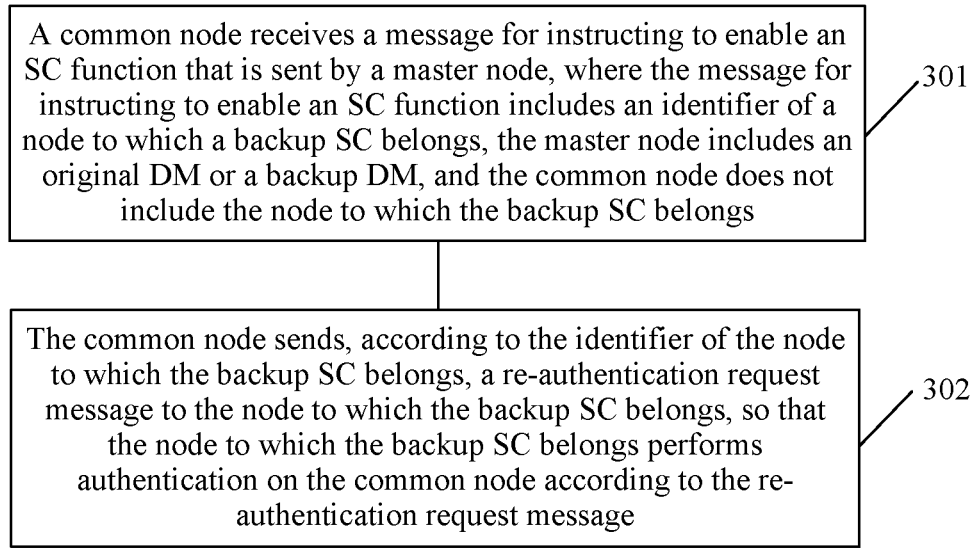
FIG. 3 is a schematic flowchart of another SC restoration method according to an embodiment of the present invention.

According to one aspect, referring to FIG. 3, FIG. 3 is a security controller SC restoration method provided in an embodiment of the present invention, where the method includes:

301. A common node receives a message for instructing to enable an SC function that is sent by a master node, where the message for instructing to enable an SC function includes an identifier of a node to which a backup SC belongs, the master node includes an original DM or a backup DM, and the common node does not include the node to which the backup SC belongs.

Exemplarily, in a case in which it is determined that a node to which an original SC belongs is disconnected, the master node sends the message for enabling an SC function to the common node, where the message for instructing to enable an SC function includes the identifier of the node to which the backup SC belongs, and the master node includes the original DM or the backup DM. For methods for acquiring the backup SC and acquiring the backup DM, reference may be made to the foregoing embodiments, and details are not described herein again.

302. The common node sends, according to the identifier of the node to which the backup SC belongs, a re-authentication request message to the node to which the backup SC belongs, so that the node to which the backup SC belongs performs authentication on the common node according to the re-authentication request message.

Exemplarily, the common node may further send, to the node to which the backup SC belongs, a request message for updating a key, so that the node to which the backup SC belongs updates or creates a key for the common node.

According to the security controller SC restoration method provided in this embodiment of the present invention, a common node receives a message for instructing to enable an SC function that is sent by a master node, and sends a re-authentication request message to a node to which a backup SC belongs, so that the node to which the backup SC belongs performs authentication on the common node. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

The following describes the foregoing methods by using several specific embodiments.

Embodiment 1 and Embodiment 2 describe methods for implementing SC restoration when an original DM is different from a node to which an original SC belongs. Embodiment 3 and Embodiment 4 describe methods for implementing SC restoration when an original DM is the same as a node to which an original SC belongs.

When the original DM is different from the node to which the original SC belongs, if the node to which the original SC belongs is considered to be disconnected and the original DM is not disconnected, a master node in a domain is always the original DM. When the original DM is the same as the node to which the original SC belongs, and the node to which the original SC belongs is disconnected, that is, the original DM is disconnected, the master node in the domain changes from the original DM to a backup DM.

Embodiment 1

When an original DM is different from a node to which an original SC belongs, the following scenarios may be included:
(1) The original DM pre-designates a node to which a backup SC belongs, where the original DM is the same as the node to which the backup SC belongs.
(2) The original DM pre-designates a node to which a backup SC belongs, where the original DM is different from the node to which the backup SC belongs.
(3) After it is determined that the node to which the original SC belongs is disconnected, the original DM designates a node to which a backup SC belongs, where the original DM is the same as the node to which the backup SC belongs.
(4) After it is determined that the node to which the original SC belongs is disconnected, the original DM designates a node to which a backup SC belongs, where the original DM is different from the node to which the backup SC belongs.

Figure 4:
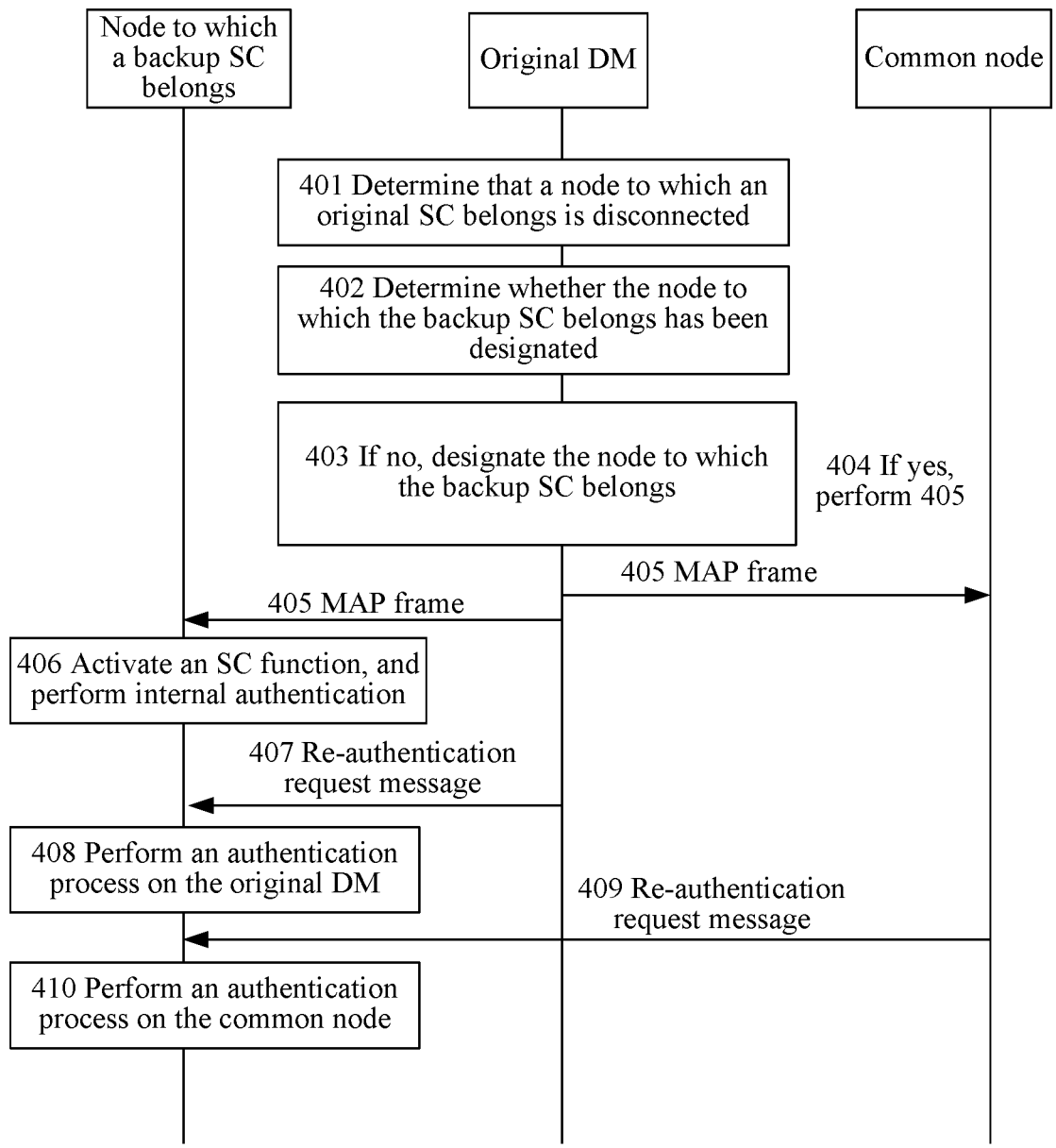
FIG. 4 is a schematic interaction diagram of an SC restoration method according to an embodiment of the present invention.

In this embodiment, that the original DM monitors that the node to which the original SC belongs is disconnected is used as an example for description. For scenario (2) and scenario (4), refer to FIG. 4, and the following steps are included:

401. The original DM determines that the node to which the original SC belongs is disconnected.

For the method for determining, by the original DM, that the node to which the original SC belongs is disconnected, reference may be made to the foregoing embodiments.

402. The original DM determines whether a node to which a backup SC belongs has been designated.

403. If no, designate, according to a network topology, the node to which the backup SC belongs from a node that has an SC function, and perform step 405.

404. If yes, perform step 405.

In this case, the original DM pre-designates the node to which the backup SC belongs.

405. The original DM broadcasts a MAP frame that carries an identifier of the node to which the backup SC belongs and a flag for enabling an SC function.

406. The node to which the backup SC belongs activates an SC function, and performs internal authentication.

407. The original DM sends a re-authentication request message to the node to which the backup SC belongs.

408. The node to which the backup SC belongs performs an authentication process on the original DM.

409. A common node sends a re-authentication request message to the node to which the backup SC belongs.

410. The node to which the backup SC belongs performs an authentication process on the common node.

In addition, for scenario (1) and scenario (3), the method does not include step 407 and step 408.

Embodiment 2

Figure 5:
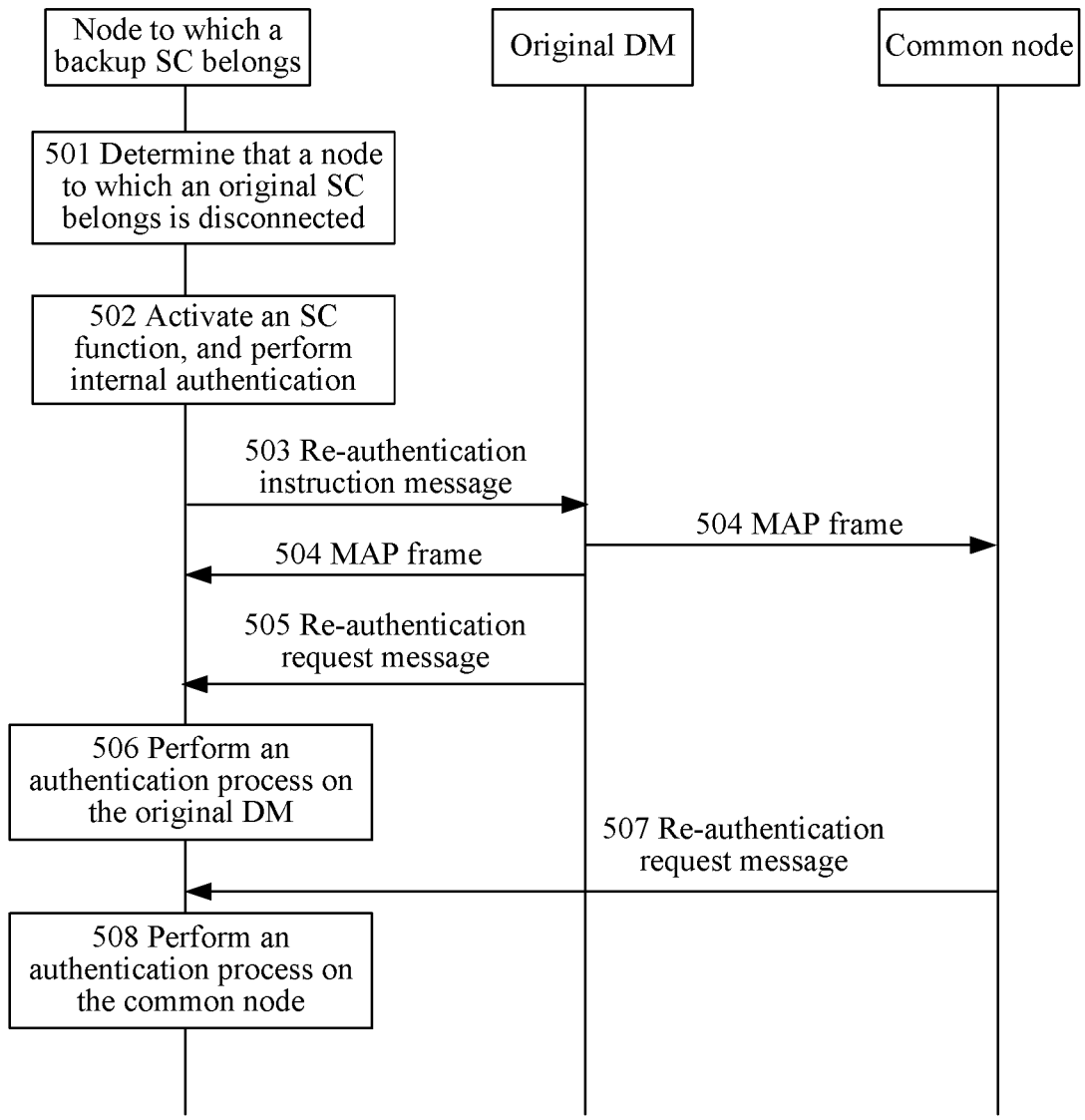
FIG. 5 is a schematic interaction diagram of another SC restoration method according to an embodiment of the present invention.

Scenario (2) in Embodiment 1 may further be implemented by using a method for first monitoring, by a node to which a backup SC belongs, that a node to which an original SC belongs is disconnected. Referring to FIG. 5, the following steps are included:

501. The node to which the backup SC belongs determines that a node to which an SC belongs is disconnected.

The node to which the backup SC belongs may periodically send an SC status detection message to the node to which the original SC belongs; if the node to which the backup SC belongs has consecutively sent an SC status detection message for a preset quantity of times and has not received a status response message from the original SC within a preset time, the node to which the backup SC belongs determines that the node to which the original SC belongs is disconnected. Alternatively, after sending a re-authentication request message or a key updating message to the node to which the original SC belongs, when the node to which the backup SC belongs has not received a response message from the node to which the original SC belongs within a preset time, the node to which the backup SC belongs sends a status detection message to the node to which the original SC belongs; when the backup SC has not received a status response message from the node to which the original SC belongs within a preset time, the backup SC determines the node to which the original SC belongs is disconnected.

503. The node to which the backup SC belongs activates an SC function of the node to which the backup SC belongs, and performs internal authentication.

In the following steps, the node to which the backup SC belongs performs a work task of an SC in a domain.

503. The backup SC sends a re-authentication instruction message to an original DM, where the re-authentication instruction message includes an identifier of the node to which the backup SC belongs.

504. The original DM broadcasts a MAP frame that carries the identifier of the node to which the backup SC belongs and a flag for enabling an SC function.

In a specific implementation process, generally, a node that is not disconnected in the domain and except the original DM may receive a MAP frame broadcasted by the original DM or a MAP frame forwarded by a MAP relay node.

505. The original DM sends a re-authentication request message to the node to which the backup SC belongs.

506. The node to which the backup SC belongs performs an authentication process on the original DM.

507. A common node sends a re-authentication request message to the node to which the backup SC belongs.

508. The node to which the backup SC belongs performs an authentication process on the common node.

Embodiment 3

A scenario of this embodiment is that an original DM is the same as a node to which an original SC belongs, and the original DM pre-designates a backup DM. The following scenarios are included:
 (1) The original DM pre-designates a node to which a backup SC belongs.
 (2) The original DM does not pre-designate a node to which a backup SC belongs.

Figure 6:
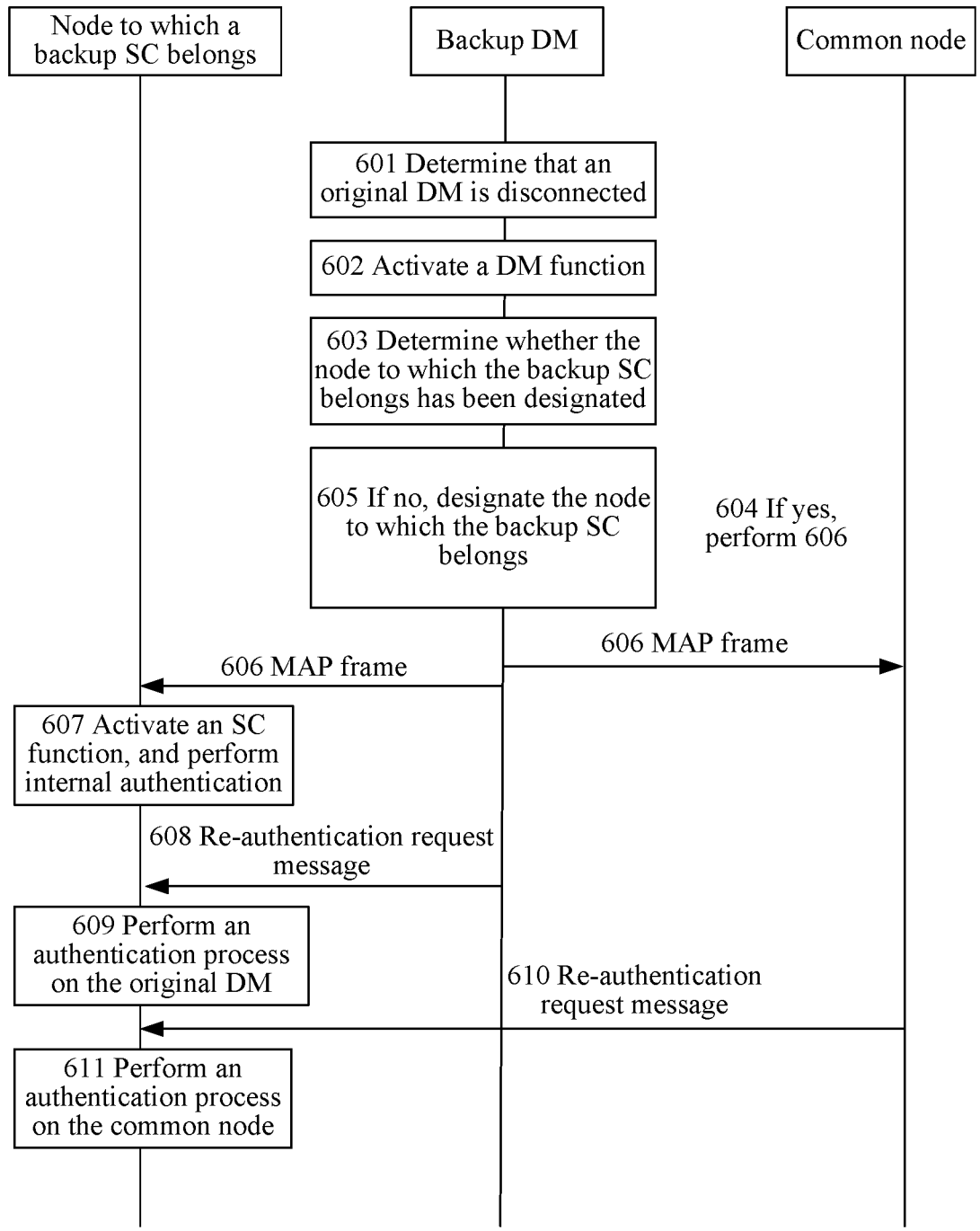
FIG. 6 is a schematic interaction diagram of another SC restoration method according to an embodiment of the present invention.

In this embodiment, that the backup DM monitors that the original DM is disconnected (the node to which the original SC belongs is disconnected) is used as an example for description. Referring to FIG. 6, the following steps are included:

601. The backup DM determines that the original DM is disconnected.

When the backup DM has not detected a MAP or RMAP frame within a preset time, has not detected transmission, except continuous scheduling, from any other node, and may learn that a node that still can perform transmission indicates that no DM is detected, the backup DM determines that the original DM is disconnected.

Because the original DM is the same as the node to which the original SC belongs, that the original DM is disconnected indicates that the node to which the original SC belongs is disconnected.

602. The backup DM activates a DM function.

The backup DM in the following step is referred to as a master node.

603. The backup DM determines, according to a status of a domain, whether the node to which the backup SC belongs has been designated in the domain.

The backup DM determines, according to a received MAP frame, whether the current MAP frame includes related domain information of the backup SC; and if the current MAP frame includes the related domain information of the backup SC, determines that the backup SC has been designated in the current domain; or if the current MAP frame does not includes the related domain information of the backup SC, determines that the backup SC has not been designated in the current domain.

604. If yes, perform step 606.

This step indicates that the node to which the backup SC belongs has been pre-designated for the original DM.

605. If no, the backup DM designates, according to a network topology, the node to which the backup SC belongs from a node that has an SC function.

If the backup DM has the SC function, the backup DM may designate the backup DM as the node to which the backup SC belongs. That the backup DM does not designate the backup DM as the node to which the backup SC belongs is used as an example in this method for description.

606. If yes, the backup DM broadcasts a MAP frame that carries an identifier of the node to which the backup SC belongs and a flag for enabling an SC function.

607. The node to which the backup SC belongs activates an SC function, and performs internal authentication.

608. The backup DM sends a re-authentication request message to the node to which the backup SC belongs.

609. The node to which the backup SC belongs performs an authentication process on the backup DM.

610. A common node sends a re-authentication request message to the node to which the backup SC belongs.

611. The node to which the backup SC belongs performs an authentication process on the common node.

In addition, if the backup DM designates the backup DM as the node to which the backup SC belongs, the method does not include step 608 and step 609.

Embodiment 4

A scenario of this embodiment is that an original DM is the same as a node to which an original SC belongs, and the original DM does not pre-designate a backup DM. The following scenarios are included:
 (1) The original DM pre-designates a node to which a backup SC belongs, where the backup DM is different from the node to which the backup SC belongs.
 (2) The original DM pre-designates a node to which a backup SC belongs, where the backup DM is the same as the node to which the backup SC belongs.

Figure 7:
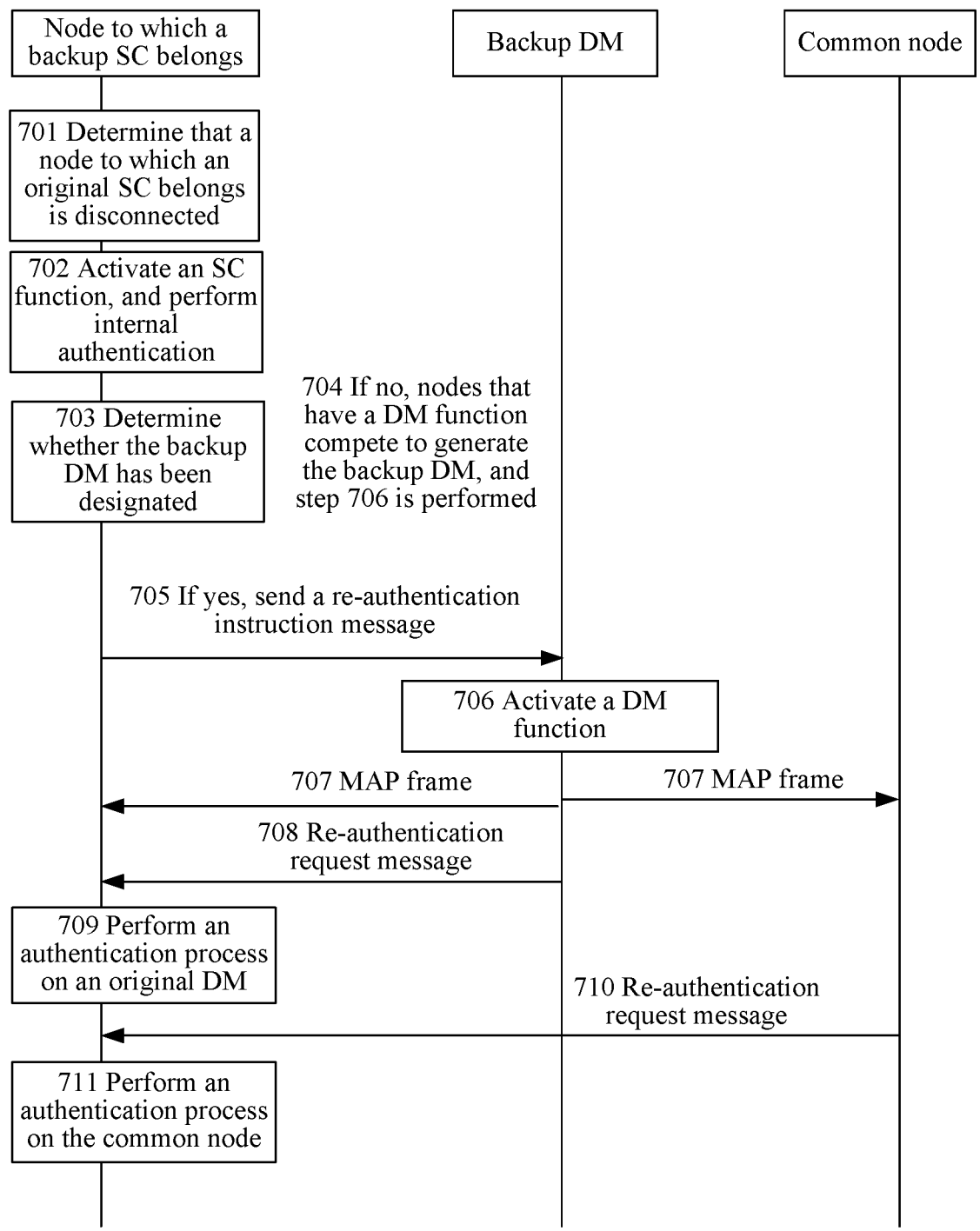
FIG. 7 is a schematic interaction diagram of yet another SC restoration method according to an embodiment of the present invention.

In this embodiment, that the node to which the backup SC belongs monitors that the node to which the original SC belongs is disconnected is used as an example for description. For scenario (1), referring to FIG. 7, the following steps are included:

701. The node to which the backup SC belongs determines that the node to which the original SC belongs is disconnected.

702. The node to which the backup SC belongs activates an SC function, and performs internal authentication.

703. The node to which the backup SC belongs determines, according to a domain, whether a backup DM has been designated in the domain.

704. If no, nodes participate in competition for the backup DM according to whether the nodes have a DM function, and finally, a node becomes the backup DM (a master node); performs step 706.

The nodes herein include common nodes that have a DM function. In addition, if the node to which the backup SC belongs has a DM function, the node to which the backup SC belongs may also participate in the competition for the backup DM; if the backup SC becomes the backup DM (the master node) by means of competition, scenario (2) applies; otherwise, scenario (1) applies.

705. If yes, the node to which the backup SC belongs sends a re-authentication instruction message to the backup DM.

706. The backup DM activates a DM function.

707. The backup DM (the master node) broadcasts a MAP frame that carries an identifier of the node to which the backup SC belongs and a flag for enabling an SC function.

708. The backup DM sends a re-authentication request message to the node to which the backup SC belongs.

709. The node to which the backup SC belongs performs an authentication process on an original DM.

710. A common node sends a re-authentication request message to the node to which the backup SC belongs.

711. The node to which the backup SC belongs performs an authentication process on the common node.

In addition, for scenario (2), the method does not include step 708 and step 709.

Embodiment 5

A scenario of this embodiment is that an original DM does not pre-designate a backup DM. The following scenarios are included:

(1) The original DM does not pre-designate a node to which a backup SC belongs, where the backup DM is different from the node to which the backup SC belongs.

(2) The original DM does not pre-designate a node to which a backup SC belongs, where the backup DM is the same as the node to which the backup SC belongs.

This embodiment is described from a perspective of a common node, and that the common node becomes a master node, and the master node designates a node to which a backup SC belongs is mainly used as an example for description. For a process of restoring an SC, reference may be made to the foregoing embodiments, and details are not described in this embodiment again.

Figure 8:
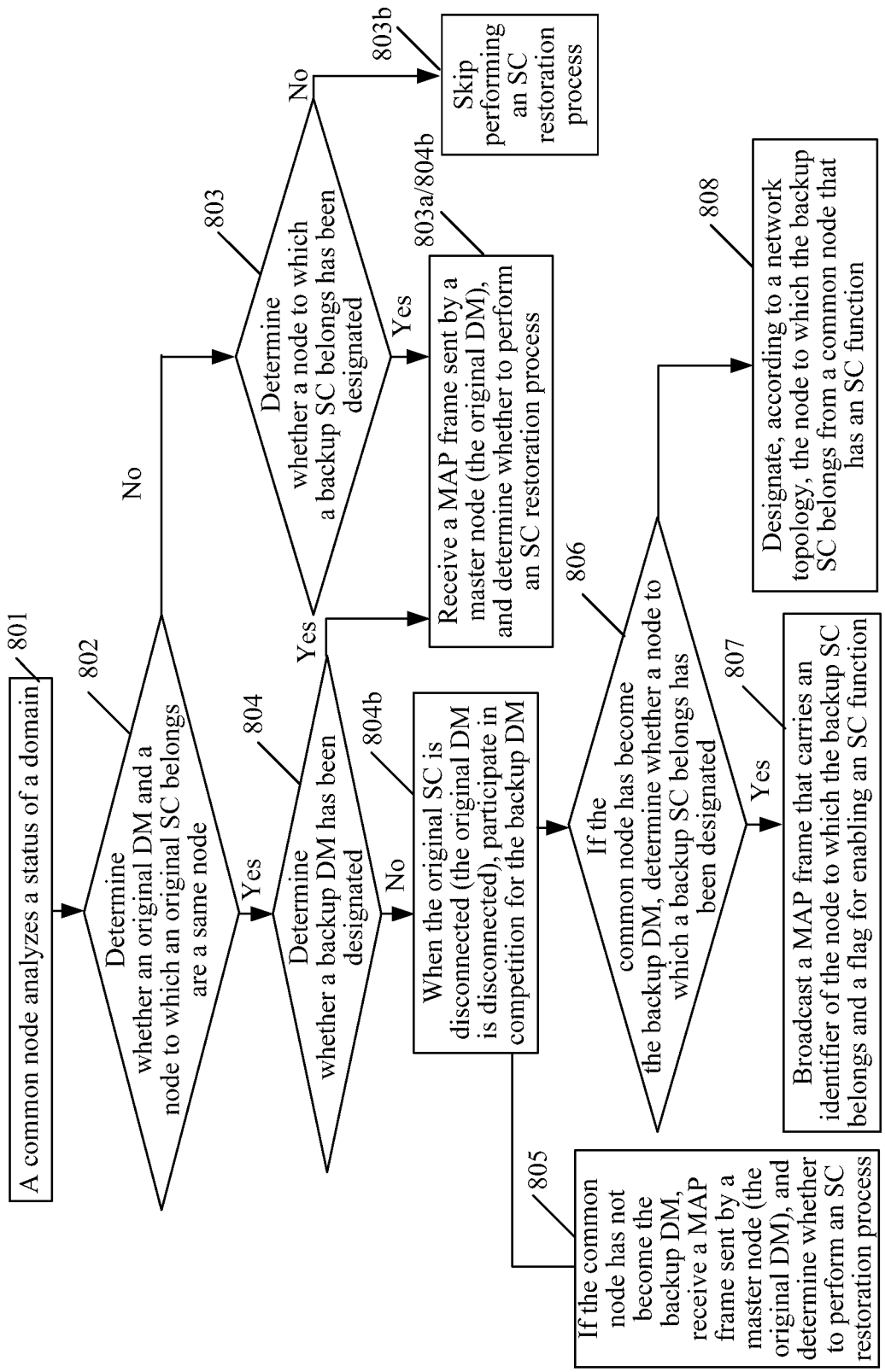
FIG. 8 is a schematic flowchart of yet another SC restoration method according to an embodiment of the present invention.

Referring to FIG. 8, the following steps are included:

801. The common node analyzes a status of a domain.

The common node does not include a backup DM or the node to which the backup SC belongs; the status of the domain may include: an identifier of an original DM in the domain, and an identifier of a node to which an original SC belongs, and may further include: an identifier of the backup DM, an identifier of the node to which the backup SC belongs, and the like. The status of the domain may be carried in a MAP frame broadcast by the master node, where the master node may be the original DM or the backup DM.

802. Determine whether an original DM is the same as a node to which an original SC belongs.

803. If no, determine whether the node to which the backup SC belongs has been designated.

The original DM and the node to which the original SC belongs are not a same node. When the node to which the original SC belongs is considered to be disconnected, the original DM works normally.

803*a*. If the node to which the backup SC belongs has been designated, receive a MAP frame sent by the master node (the original DM), and determine, according to the node to which the backup SC belongs and information indicating whether to enable an SC function that are included in the MAP frame, whether to perform an SC restoration process.

Specifically, if the MAP frame includes information for enabling an SC function, authentication and updating or creating a key are performed on the node to which the backup SC belongs; otherwise, the SC restoration process is not performed.

In this case, the common node is always a common node in the entire SC restoration process.

803*b*. If the node to which the backup SC belongs has not been designated, skip performing an SC restoration process.

804. If yes, determine whether a backup DM has been designated.

The original DM is the same as the node to which the original SC belongs. If the node to which the original SC belongs is disconnected, the original DM is disconnected. Whether the node to which the original SC belongs is disconnected may be determined by determining, by the backup DM, whether the original DM is disconnected.

804*a*. If the backup DM has been designated, receive a MAP frame sent by the master node (the original DM), and determine, according to the node to which the backup SC belongs and information indicating whether to enable an SC function that are included in the MAP frame, whether to perform an SC restoration process.

Specifically, if the MAP frame includes information for enabling an SC function, authentication and updating and creating a key are performed on the node to which the backup SC belongs; otherwise, the SC restoration process is not performed.

In this case, the common node is always a common node in the entire SC restoration process.

804*b*. If the backup DM has not been designated, the common node participates in competition for the backup DM when the original SC is disconnected (the original DM is disconnected).

In a case in which the common node cannot receive the MAP frame broadcast by the master node (the original DM) within a preset time, and finds that another common node has not received the MAP frame either, the common node may determine that the original SC is disconnected (the original DM is disconnected). The preset time may be set according to an empirical value or an actual implementation process. The common node that participates in the competition for the backup DM has a DM function; if a common node does not have a DM function, the common node cannot participate in the competition for the backup DM.

805. If the common node has not become the backup DM, the common node receives a MAP frame sent by the master node (the backup DM), and determines, according to the node to which the backup SC belongs and information indicating whether to enable an SC function that are included in the MAP frame, whether to perform an SC restoration process.

Specifically, if the MAP frame includes information for enabling an SC function, authentication and updating or creating a key are performed on the node to which the backup SC belongs; otherwise, the SC restoration process is not performed.

In this case, the common node is always a common node in the entire SC restoration process.

806. If the common node has become the backup DM, determine whether the node to which the backup SC belongs has been designated.

807. If the node to which the backup SC belongs has been designated, broadcast a MAP frame that carries an identifier of the node to which the backup SC belongs and a flag for enabling an SC function.

In this case, in the domain, the common node becomes the backup DM (the master node).

808. If the node to which the backup SC belongs has not been designated, designate, according to a network topology, the node to which the backup SC belongs from a common node that has an SC function.

According to the security controller SC restoration method provided in this embodiment of the present invention, a common node receives a message for instructing to enable an SC function that is sent by a master node, and sends a re-authentication request message to a node to which a backup SC belongs, so that the node to which the backup SC belongs performs authentication on the common node. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

Figure 9:
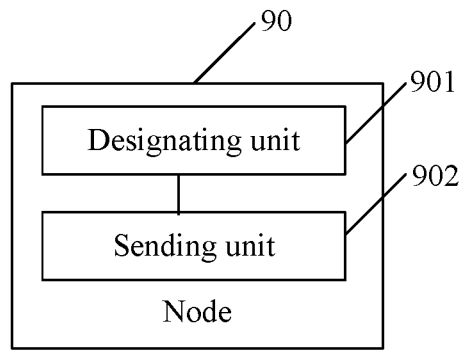
FIG. 9 is a schematic structural diagram of a node according to an embodiment of the present invention.

According to one aspect, referring to FIG. 9, FIG. 9 is a node 90 provided in an embodiment of the present invention, where the node 90 is configured to perform the method shown in FIG. 1, and includes:
 a designating unit 901, configured to designate a node to which a backup SC belongs, where the node 90 includes an original DM or a backup DM; and
 a sending unit 902, configured to send, to a first node, a message indicating the backup SC, where the message indicating the backup SC includes an identifier, transmitted by the designating unit 901, of the node to which the backup SC belongs; where
 the sending unit 902 is further configured to: in a case in which a node to which an original SC belongs is disconnected, send, to the first node, a message for enabling an SC function, so that the first node performs authentication, according to the message for enabling an SC function, on the node to which the backup SC belongs, where the message for enabling an SC function includes the identifier of the node to which the backup SC belongs.

Figure 10:
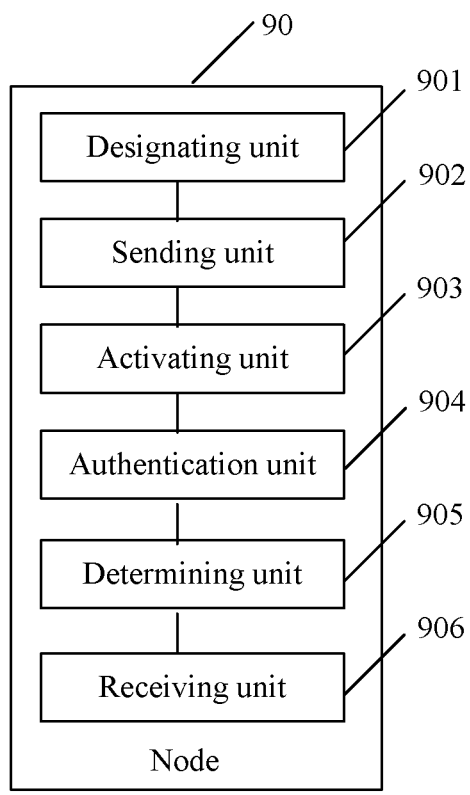
FIG. 10 is a schematic structural diagram of another node according to an embodiment of the present invention.

Further, referring to FIG. 10, when the node 90 is the same as the node to which the backup SC belongs, the first node is a node except the node 90, and the node 90 further includes:
 an activating unit 903, configured to activate an SC function of the node 90; and
 an authentication unit 904, configured to perform authentication within the node; or
 when the node 90 is different from the node to which the backup SC belongs, the first node is a node except the node 90 and the node to which the backup SC belongs; and the sending unit 902 is further configured to send, to the node to which the backup SC belongs, the message for enabling an SC function and/or a re-authentication request message, so that the node to which the backup SC belongs activates an SC function of the node to which the backup SC belongs, and performs authentication within the node to which the backup SC belongs.

Optionally, the designating unit 901 is configured to pre-designate, according to a network topology, the node to which the backup SC belongs from a node that has an SC capability, where the node 90 is the original DM.

Further, referring to FIG. 10, the node 90 further includes: a determining unit 905, configured to determine that the node to which the original SC belongs is disconnected.

The node 90 further includes:
 a receiving unit 906, configured to receive a re-authentication instruction message sent by the node to which the backup SC belongs; where the determining unit 905 is configured to determine, according to the re-authentication instruction message, that the node to which the original SC belongs is disconnected; or
 the determining unit 905 is configured to monitor a status of the node to which the original SC belongs.

Optionally, the designating unit 901 is configured to: in a case in which the node 90 determines that the node to which the original SC belongs is disconnected, designate, according to a network topology, the node to which the backup SC belongs from a node that has an SC capability, where
 when the node to which the original SC belongs is the same as the original DM, the node 90 is the backup DM; or, when the node to which the original SC belongs is different from the original DM, the node 90 is the original DM.

Further, referring to FIG. 10, the node 90 further includes:
 a determining unit 905, configured to determine that the node to which the original SC belongs is disconnected, and configured to:
 when the node to which the original SC belongs is the same as the original DM, monitor the original DM; and when the original DM is disconnected, determine that the node to which the original SC belongs is disconnected; or
 when the node to which the original SC belongs is different from the original DM, monitor a status of the node to which the original SC belongs.

Exemplarily, the node 90 may be the master node in the embodiment shown in FIG. 1.

The node provided in this embodiment of the present invention designates a node to which a backup SC belongs, sends a message indicating the backup SC to a first node, and sends, in a case in which a node to which an original SC belongs is disconnected, a message for enabling the backup SC to the first node, so that the first node performs authentication, according to the message for enabling an SC function, on the node to which the backup SC belongs. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

Figure 11:
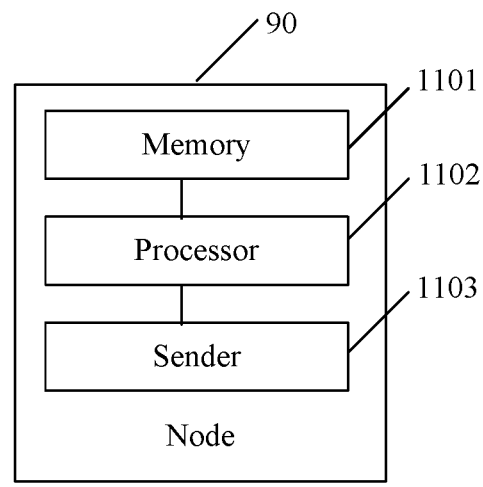
FIG. 11 is a schematic structural diagram of another node according to an embodiment of the present invention.

According to one aspect, referring to FIG. 11, FIG. 11 is a node 90 provided in an embodiment of the present invention, where the node 90 is configured to perform the method shown in FIG. 1, and includes: a memory 1101, a processor 1102, and a sender 1103.

The memory 1101 is configured to store a set of code, where the code is used to control the processor 1102 to designate a node to which a backup SC belongs, and the node 90 includes an original DM or a backup DM.

The sender 1103 is configured to send, to a first node, a message indicating the backup SC, where the message indicating the backup SC includes an identifier of the node to which the backup SC belongs.

The sender 1103 is further configured to: in a case in which a node to which an original SC belongs is disconnected, send, to the first node, a message for enabling an SC function, so that the first node performs authentication, according to the message for enabling an SC function, on the node to which the backup SC belongs, where the message for enabling an SC function includes the identifier of the node to which the backup SC belongs.

Further, the processor 1102 is further configured to activate an SC function of the node 90, and perform authentication within the node; or
when the node 90 is different from the node to which the backup SC belongs, the first node is a node except the node 90 and the node to which the backup SC belongs.

The sender 1103 is further configured to send, to the node to which the backup SC belongs, the message for enabling an SC function and/or a re-authentication request message, so that the node to which the backup SC belongs activates an SC function of the node to which the backup SC belongs, and performs authentication within the node to which the backup SC belongs.

Optionally, the processor 1102 is configured to pre-designate, according to a network topology, the node to which the backup SC belongs from a node that has an SC capability, where the node 90 is the original DM.

Further, the processor 1102 is further configured to determine that the node to which the original SC belongs is disconnected.

Figure 12:
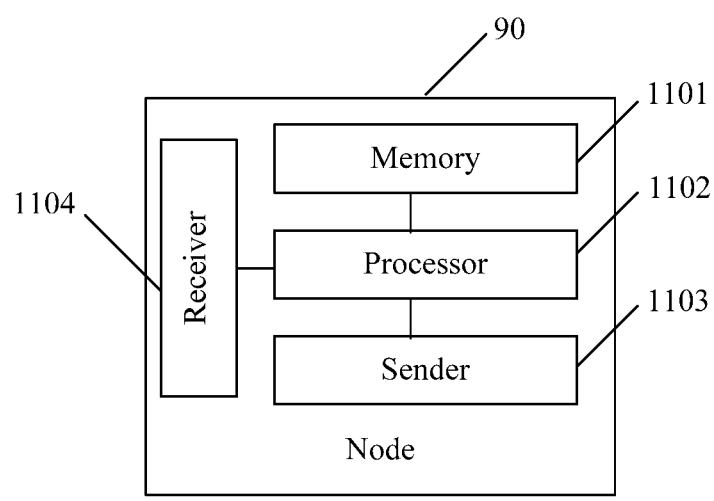
FIG. 12 is a schematic structural diagram of another node according to an embodiment of the present invention.

Referring to FIG. 12, the node 90 further includes:
a receiver 1104, configured to receive a re-authentication instruction message sent by the node to which the backup SC belongs.

The processor 1102 is configured to determine, according to the re-authentication instruction message, that the node to which the original SC belongs is disconnected; or
the processor 1102 is configured to monitor a status of the node to which the original SC belongs.

Optionally, the processor 1102 is configured to: in a case in which the node 90 determines that the node to which the original SC belongs is disconnected, designate, according to a network topology, the node to which the backup SC belongs from a node that has an SC capability, where
when the node to which the original SC belongs is the same as the original DM, the node 90 is the backup DM; or, when the node to which the original SC belongs is different from the original DM, the node 90 is the original DM.

Further, the processor 1102 is further configured to determine that the node to which the original SC belongs is disconnected, and is configured to:
when the node to which the original SC belongs is the same as the original DM, monitor the original DM; and when the original DM is disconnected, determine that the node to which the original SC belongs is disconnected; or
when the node to which the original SC belongs is different from the original DM, monitor a status of the node to which the original SC belongs.

Exemplarily, the node 90 may be the master node in the embodiment shown in FIG. 1.

The node provided in this embodiment of the present invention designates a node to which a backup SC belongs, sends a message indicating the backup SC to a first node, and sends, in a case in which a node to which an original SC belongs is disconnected, a message for enabling the backup SC to the first node, so that the first node performs authentication, according to the message for enabling an SC function, on the node to which the backup SC belongs. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

Figure 13:
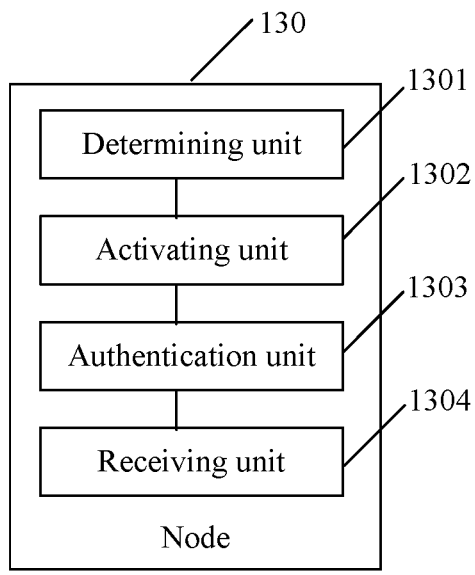
FIG. 13 is a schematic structural diagram of another node according to an embodiment of the present invention.

According to one aspect, referring to FIG. 13, FIG. 13 is a node 130 provided in an embodiment of the present invention, where the node 130 is configured to perform the method shown in FIG. 2, and includes:
a determining unit 1301, configured to determine that a node to which an original SC belongs is disconnected;
an activating unit 1302, configured to activate an SC function of the node 130 in a case in which the determining unit 1301 determines that the node to which the original SC belongs is disconnected;
an authentication unit 1303, configured to perform internal authentication after the activating unit 1302 activates the SC function; and
a receiving unit 1304, configured to receive a re-authentication request message sent by a second node, where the second node is a node except the node; where
the authentication unit 1301 is further configured to perform authentication on the second node according to the re-authentication request message.

Further, the determining unit 1301 is configured to monitor the node to which the original SC belongs; or
the receiving unit 1304 is further configured to receive a message for instructing to enable an SC function that is sent by a master node; and the determining unit 1301 is configured to determine, according to the message for enabling an SC function, that the node to which the original SC belongs is disconnected, where the message for enabling an SC function includes an identifier of the node.

Exemplarily, the node 130 may be the node to which the original SC belongs in the method shown in FIG. 2.

The node provided in this embodiment of the present invention activates, in a case in which it is determined that a node to which an original SC belongs is disconnected, an SC function of the node, and performs internal authentication, then receives a re-authentication request message sent by a second node, and performs authentication on the second node according to the re-authentication request message. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

Figure 14:
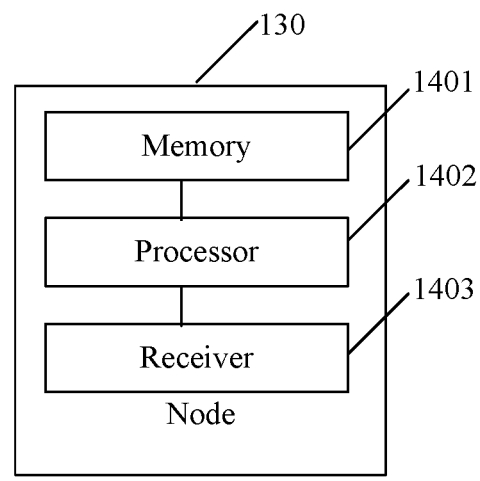
FIG. 14 is a schematic structural diagram of a further node according to an embodiment of the present invention.

According to one aspect, referring to FIG. 14, FIG. 14 is a node 130 provided in an embodiment of the present invention, where the node 130 is configured to perform the method shown in FIG. 2, and includes: a memory 1401, a processor 1402, and a receiver 1403.

The memory 1403 is configured to store a set of code, where the code is used to control the processor 1402 to perform the following actions: determining that a node to which an original SC belongs is disconnected; in a case in which the node to which the original SC belongs is disconnected, activating an SC function of the node 130; and performing internal authentication after activating the SC function.

The receiver 1403 is configured to receive a re-authentication request message sent by a second node, where the second node is a node except the node.

The processor 1402 is further configured to perform authentication on the second node according to the re-authentication request message.

Further, the processor 1402 is configured to monitor the node to which the original SC belongs; or the receiver 1403 receives a message for instructing to enable an SC function that is sent by a master node; and the processor 1402 is configured to determine, according to the message for enabling an SC function, that the node to which the original SC belongs is disconnected, where the message for enabling an SC function includes an identifier of the node.

Exemplarily, the node 130 may be the node to which the original SC belongs in the method shown in FIG. 2.

The node provided in this embodiment of the present invention activates, in a case in which it is determined that a node to which an original SC belongs is disconnected, an SC function of the node, and performs internal authentication, then receives a re-authentication request message sent by a second node, and performs authentication on the second node according to the re-authentication request message. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

Figure 15:
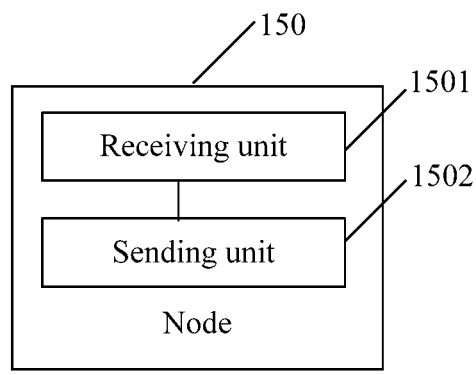
FIG. 15 is a schematic structural diagram of a further node according to an embodiment of the present invention.

According to one aspect, referring to FIG. 15, FIG. 15 is a node 150 provided in an embodiment of the present invention, where the node 150 is configured to perform the method shown in FIG. 3, and includes:

a receiving unit 1501, configured to receive a message for instructing to enable an SC function that is sent by a master node, where the message for instructing to enable an SC function includes an identifier of a node to which a backup SC belongs, and the master node includes an original DM or a backup DM; and a sending unit 1502, configured to send, according to the identifier of the node to which the backup SC belongs, a re-authentication request message to the node to which the backup SC belongs, so that the node to which the backup SC belongs performs authentication on the node according to the re-authentication request message.

Exemplarily, the node 150 may be the common node in the method shown in FIG. 3.

The node provided in this embodiment of the present invention receives a message for instructing to enable an SC function that is sent by a master node, and sends a re-authentication request message to a node to which a backup SC belongs, so that the node to which the backup SC belongs performs authentication on a common node. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

Figure 16:
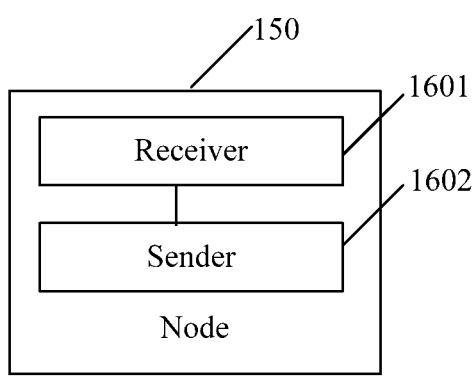
FIG. 16 is a schematic structural diagram of a further node according to an embodiment of the present invention.

According to one aspect, referring to FIG. 16, FIG. 16 is a node 150 provided in an embodiment of the present invention, where the node 150 is configured to perform the method shown in FIG. 3, and includes:

a receiver 1601, configured to receive a message for instructing to enable an SC function that is sent by a master node, where the message for instructing to enable an SC function includes an identifier of a node to which a backup SC belongs, and the master node includes an original DM or a backup DM; and a sender 1602, configured to send, according to the identifier of the node to which the backup SC belongs, a re-authentication request message to the node to which the backup SC belongs, so that the node to which the backup SC belongs performs authentication on the node according to the re-authentication request message.

Exemplarily, the node 150 may be the common node in the method shown in FIG. 3.

The node provided in this embodiment of the present invention receives a message for instructing to enable an SC function that is sent by a master node, and sends a re-authentication request message to a node to which a backup SC belongs, so that the node to which the backup SC belongs performs authentication on a common node. SC restoration is implemented in a case in which a node to which an original SC belongs is disconnected, so that a network normally works in a security mode, thereby improving network stability, and resolving a problem in the conventional art that, there is no available SC in a network because an SC is disconnected and consequently the network cannot normally work in the security mode.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A security controller (SC) restoration method comprising:
    assigning, by a master node, a backup SC to a first node, wherein the master node is an original domain master (DM) node or a backup DM node;
    sending, by the master node, a first message regarding the backup SC to a second node, wherein the first message comprises an identifier of the first node to which the backup SC belongs;
    when a third node to which an original SC belongs is disconnected and the first and master nodes are different nodes, sending, by the master node, a second message for enabling an SC function at the first node; and
    when the master node is different from a node to which the backup SC belongs, the first node is different from both the master node and the node to which the backup SC belongs, sending, by the master node, a re-authentication request message to the first node.

2. The method according to claim 1, wherein assigning, by the master node, the node to which the backup SC belongs comprises:
    pre-assigning, by the master node according to a network topology, the node to which the backup SC belongs from a node that has an SC capability, wherein the master node is the original DM node.

3. The method according to claim 2, further comprising:
    monitoring, by the master node, a status of a node to which the original SC belongs.

4. The method according to claim 1, wherein assigning, by the master node, the node to which the backup SC belongs comprises:
    when it is determined that a node to which the original SC belongs is disconnected, assigning, by the master node according to a network topology, the node to which the backup SC belongs from a node that has an SC capability, wherein a) when the node to which the original SC belongs is the same as the original DM node, the master node is the backup DM node; or,
    b) when the node to which the original SC belongs is different from the original DM node, the master node is the original DM node.

5. The method according to claim 4, further comprising:
    determining, by the master node, that the node to which the original SC belongs is disconnected, including:
    when the node to which the original SC belongs is the same as the original DM node, monitoring, by the master node, the original DM node; and
    when the original DM node is disconnected, determining, by the master node, that the node to which the original SC belongs is disconnected; or
    when the node to which the original SC belongs is different from the original DM node, monitoring, by the master node, a status of the node to which the original SC belongs.

6. A master node comprising:
    a processor configured to assign a first node to which a backup security controller (SC) belongs, wherein the first node comprises an original domain master (DM) node or a backup DM node;
    a transmitter configured to cooperate with the processor to
        (a) send a first message regarding the backup SC to a second node, wherein the first message comprises an identifier of the first node to which the backup SC belongs, and
        (b) when a third node to which an original SC belongs is disconnected and the first and master nodes are different nodes, send a second message for enabling an SC function at the first node, and
        (c) when the master node is different from a node to which the backup SC belongs, the first node is different from both the master node and the node to which the backup SC belongs, sending, by the master node, a re-authentication request message.

7. The master node according to claim 6, wherein
    the processor is configured to pre-assign, according to a network topology, the node to which the backup SC belongs from a node that has an SC capability, wherein the node is the original DM node.

8. The master node according to claim 6, wherein the processor is configured to monitor a status of a node to which the original SC belongs.

9. The master node according to claim 6, wherein
    the processor is configured to, when it is determined that a node to which the original SC belongs is disconnected, assign, according to a network topology, the node to which the backup SC belongs from a node that has an SC capability, wherein
    a) when the node to which the original SC belongs is the same as the original DM node, the node is the backup DM node; or,
    b) when the node to which the original SC belongs is different from the original DM node, the node is the original DM node.

10. The master node according to claim 9, wherein the processor is further configured to determine that the node to which the original SC belongs is disconnected, and:
    a) when the node to which the original SC belongs is the same as the original DM node, monitor the original DM node, and when the original DM node is disconnected, determine that the node to which the original SC belongs is disconnected; or b) when the node to which the original SC belongs is different from the original DM node, monitor a status of the node to which the original SC belongs.

11. A non-transitory computer-readable storage medium comprising instructions which, when executed by a computer, cause the computer to carry out operations including:
assigning a backup security controller (SC) to a first node, wherein a master node is an original domain master (DM) node or a backup DM node;
sending a first message regarding the backup SC to a second node, wherein the first message comprises an identifier of the first node to which the backup SC belongs;
when a third node to which an original SC belongs is disconnected and the first and master nodes are different nodes, sending a second message for enabling an SC function at the first node; and
when the master node is different from a node to which the backup SC belongs, the first node is different from both the master node and the node to which the backup SC belongs, sending a re-authentication request message to the first node.

12. A non-transitory computer-readable storage medium comprising instructions which, when executed by a computer, cause the computer to carry out operations including:
assigning a backup security controller (SC) function to a first node, wherein a master node is an original domain master (DM) node or a backup DM node;
sending a first message regarding the backup SC to a second node, wherein the first message comprises an identifier of the first node to which the backup SC belongs;
when a third node to which an original SC belongs is disconnected and the first and master nodes are different nodes, sending a second message for enabling an SC function at the first node by performing authentication according to the second message on the first node; and
when the master node is the same as the first node, activating the SC function for performing authentication at the master node.

13. The non-transitory computer-readable storage medium according to claim 11, wherein the operation of assigning the node to which the backup SC belongs comprises:
pre-assigning, according to a network topology, the node to which the backup SC belongs from a node that has an SC capability, wherein the master node is the original DM node.

14. The non-transitory computer-readable storage medium according to claim 13, wherein the operations further comprise:
monitoring, a status of a node to which the original SC belongs.

15. The non-transitory computer-readable storage medium according to claim 11, wherein the operation of assigning the node to which the backup SC belongs comprises:
when it is determined that the node to which the original SC belongs is disconnected, assigning, according to a network topology, the node to which the backup SC belongs from a node that has an SC capability, wherein a) when a node to which the original SC belongs is the same as the original DM node, the master node is the backup DM node; or,
b) when the node to which the original SC belongs is different from the original DM node, the master node is the original DM node.

16. The non-transitory computer-readable storage medium according to claim 15, wherein the operations further comprise:
determining, that the node to which the original SC belongs is disconnected, including:
when the node to which the original SC belongs is the same as the original DM node, monitoring, the original DM node; and
when the original DM node is disconnected, determining, that the node to which the original SC belongs is disconnected; or
when the node to which the original SC belongs is different from the original DM node, monitoring, a status of the node to which the original SC belongs.

17. The non-transitory computer-readable storage medium according to claim 12, wherein the operation of assigning the node to which the backup SC belongs comprises:
pre-assigning, according to a network topology, the node to which the backup SC belongs from a node that has an SC capability, wherein the master node is the original DM node.

18. The non-transitory computer-readable storage medium according to claim 17, wherein the operations further comprise:
monitoring, a status of a node to which the original SC belongs.

19. The non-transitory computer-readable storage medium according to claim 12, wherein the operation of assigning the node to which the backup SC belongs comprises:
when it is determined that a node to which the original SC belongs is disconnected, assigning, according to a network topology, the node to which the backup SC belongs from a node that has an SC capability, wherein
a) when the node to which the original SC belongs is the same as the original DM node, the master node is the backup DM node; or,
b) when the node to which the original SC belongs is different from the original DM node, the master node is the original DM node.

20. The non-transitory computer-readable storage medium according to claim 19, wherein the operations further comprise:
determining, that the node to which the original SC belongs is disconnected, including:
when the node to which the original SC belongs is the same as the original DM node, monitoring, the original DM node; and
when the original DM node is disconnected, determining, that the node to which the original SC belongs is disconnected; or
when the node to which the original SC belongs is different from the original DM node, monitoring, a status of the node to which the original SC belongs.

* * * * *